United States Patent [19]

Vronsky et al.

[11] Patent Number: 5,594,556
[45] Date of Patent: Jan. 14, 1997

[54] SCANNER HAVING A MISALIGNMENT DETECTOR

[75] Inventors: Eliyahu Vronsky, Ramat Hasharon; Boaz Kenan, Rehovot, both of Israel

[73] Assignee: Scitex Corporation Ltd., Israel

[21] Appl. No.: 215,840

[22] Filed: Mar. 21, 1994

[30] Foreign Application Priority Data

Mar. 28, 1993 [IL] Israel .......................... 105188

[51] Int. Cl.$^6$ .............................. H04N 1/04; G02B 26/08
[52] U.S. Cl. ......................... 358/482; 358/474; 359/196; 359/216
[58] Field of Search ..................... 358/482, 480, 358/481, 474, 494; 359/196, 202, 203, 211, 216, 217, 218, 205, 226; 355/233; H04N 1/04

[56] References Cited

U.S. PATENT DOCUMENTS

| | | |
|---|---|---|
| 4,195,316 | 3/1980 | Sansome . |
| 4,214,157 | 7/1980 | Check, Jr. et al. ................... 250/236 |
| 4,404,596 | 9/1983 | Juergensen et al. . |
| 4,829,175 | 5/1989 | Goto et al. ........................ 250/236 |
| 5,046,796 | 9/1991 | Andoh et al. ..................... 359/216 |
| 5,245,181 | 9/1993 | Cho ................................... 358/481 |
| 5,247,174 | 9/1993 | Berman . |
| 5,253,085 | 10/1993 | Maruo et al. ..................... 358/481 |
| 5,359,434 | 10/1994 | Nakao et al. ..................... 358/481 |

FOREIGN PATENT DOCUMENTS

| | | |
|---|---|---|
| 0043720 | 1/1982 | European Pat. Off. . |
| 0406844 | 1/1991 | European Pat. Off. . |

OTHER PUBLICATIONS

*Optical Scanning*, Gerald F. Marshall, Marcel Dekker, Inc. NY, 1991 Chapter 6.

Primary Examiner—Kim Yen Vu
Assistant Examiner—Madeleine Anh-Vinh Nguyen
Attorney, Agent, or Firm—Skjervan, Morrill, MacPherson, Franklin & Friel; Forrest E. Gunnison

[57] ABSTRACT

A laser scanning device is disclosed which includes a spinner, one light spot misalignment detector and a beam misalignment corrector. The spinner scans a light beam across a scanning line. The detector is located generally at a beginning of the scanned line and measures an initial misalignment of the light spot in a cross-scanning direction. The corrector dynamically corrects, during scanning along said scanning line, the scanning misalignment of the light beam in accordance with at least the initial misalignment. The corrector includes a pre-positioner which determines an offset for the initial misalignment, a pyramidal error estimator which estimates a first portion of the misalignment due to pyramidal error and a wobble estimator which estimate a second portion of the misalignment caused by wobble. The estimations are summed together and used for correcting the misalignment.

10 Claims, 20 Drawing Sheets

SCANNER HAVING A MISALIGNMENT DETECTOR

FIELD OF THE INVENTION

The present invention relates to laser scanning devices generally and to apparatus for location control of the laser beam in particular.

BACKGROUND OF THE INVENTION

Laser scanning devices, such as laser plotters, are known in the art. As shown in FIG. 1, to which reference is now made, laser scanning devices typically comprise a laser source 10 which produces a laser beam 12 and a spinner 14 which receives the laser beam 12 after it has passed through a pre-spinner optical system 16 operative to shape and/or modify the laser beam 12.

The spinner 14 comprises a motor (not shown) and a polygon typically having a plurality of facets 18, only one of which generally is operative at a given time to reflect the laser beam 12 towards a medium 22 to be scanned. Each facet 18 is operative to scan at least one line of the medium 22 and the angle through which each facet 18 scans is indicated in FIG. 1 by the dotted lines, marked 24.

In some devices, a post-spinner optical system 20 is also included which typically comprises a flat-field lens operative to provide a planar image on the medium 22 (the focal point of the lens) and to direct the laser beam 12 towards the medium 22, typically via a mirror if the medium 22 is not, as shown in FIG. 1, parallel with a rotation axis 26 of the spinner 14 (perpendicular to the page of FIG. 1).

In order for a laser scanning device to operate at high accuracy and resolution it must accurately control the location of the laser beam, along the scan direction and along the direction perpendicular to the scan direction, the direction known as the "cross-scan" direction.

As described in Chapter 6 of the book *Optical Scanning* by Gerald F. Marshall, Marcel Dekker, Inc. N.Y., 1991 which is incorporated herein by reference, beam location errors are known to be caused by errors in the angle of one or more of the facets 18, known as "pyramidal error", by wobble of the rotation axis 26 or by a combination of both sources of error.

Pyramidal errors are illustrated in FIGS. 2A and 2B, to which reference is now briefly made. FIGS. 2A and 2B are side views of the polygon 14.

Ideally, the reflecting surface of each facet 18 should be parallel to the rotation axis 26 such that the incoming beam 12 is reflected along a plane 30 perpendicular to the rotation axis 26.

However, typically, polygons 14 are manufactured with facets, labeled 32 and 34 in FIGS. 2A and 2B, respectively, at angles $\alpha_1$ and $\alpha_2$, respectively, to the ideal direction. An incoming beam which impinges an angled facet 32 or 34 is reflected along a reflection plane which is at an angle to plane 30 twice as large as the error in the facet direction. Thus, in FIG. 2A, the reflection plane 36 is at an angle $2\alpha_1$ to the plane 30 and in FIG. 2A, the reflection plane 38 is at an angle $2\alpha_2$ to the plane 30.

The wobble is a rotation of the rotation axis 26 of the spinner 14 and is caused by inaccurate balancing of the polygon. The wobble causes a changing angular error $\alpha_3$, which, in turn, causes a changing error in the reflection plane in a manner similar to that described hereinabove for FIGS. 2A and 2B.

The scanning error is typically a combination of the two types of error and there are a plurality of methods by which prior art scanning devices reduce the scanning error.

Some prior art scanning devices include a cylindrical lens in the pre-spinner optical system 16. The cylindrical lens concentrates the laser beam into a line parallel to the scanning direction and focuses the concentrated beam onto the currently active facet 18.

However, in order to focus the reflected beam onto the medium 22, the cylindrical lens requires that the post-spinner optical system 20 be comprised of complicated optical elements, producing an expensive scanning device.

In other prior art devices, the spinner 14 is comprised of an element having two flat, opposing reflective surfaces, such as a penta-prism, from which the beam reflects. Due to the opposition of the surfaces, any errors in the laser beam caused by one surface are canceled by the reflection off the second surface.

This solution is typically utilized to reduce wobble in single faceted devices and is not easily extendible to a multi-faceted polygonal spinner.

Alternatively, in order to reduce the wobble, it is known to utilize expensive oil or air bearings for the spinner 14. If there is any pyramidal error, it is measured and a LookUp Table (LUT) is utilized to cancel it out.

Finally, it is known to include a beam position detector in the post-spinner optical system 20 and to include a reference beam, in addition to the scanning beam or beams, which follows a large percentage of the optical path of the scanning beams. The beam position detector detects the location of the reference beam, in order to continually measure the error in the location of the scanning beams. The measured data is provided either to acousto-optic deflectors for deflecting the reference and scanning beams to the correct location, or, as described in U.S. Pat. No. 5,247,174 assigned to the common owners of the present application, to piezo-electric crystals for shifting the location of fiber optic bundles which carry the scanning and reference beams to the correct location. The closed-loop control system thus produced maintains the scanning and reference beams in the desired locations.

However, the beam position detector is expensive, it requires that an additional beam, the reference beam, be produced and it includes complicated optics to ensure that the two beams follow almost identical optical paths.

SUMMARY OF THE INVENTION

It is, therefore, an object of the present invention to provide a relatively inexpensive apparatus and method for controlling the beam location.

There is therefore provided, in accordance with a preferred embodiment of the present invention, a laser scanning device which includes a) a spinner for scanning a light beam having a light spot across a scanning line, b) one light spot misalignment detector located generally at a beginning of the scanned line for measuring an initial misalignment of the light spot in a cross-scanning direction and c) a beam misalignment corrector which, during scanning along the scanning line, dynamically corrects scanning misalignment in accordance with the initial misalignment.

Additionally, in accordance with a preferred embodiment of the present invention, the beam misalignment corrector includes a) a pre-positioner which determines a pre-position signal which offsets the initial misalignment, b) estimation apparatus for producing, from the pre-position signal, an estimated scanning misalignment due to wobble and pyramidal error and c) a beam shifter responsive to the estimated scanning misalignment for shifting the light beam thereby to correct the scanning misalignment.

Moreover, in accordance with a preferred embodiment of the present invention, the estimation apparatus includes a) a pyramidal error estimator for estimating a first portion of the scanning misalignment due to pyramidal error and to an extent of wobble present at the beginning of the scanning line, b) a wobble estimator for estimating a second portion of the scanning misalignment caused by the wobble and c) a summer for summing outputs of the pyramidal error estimator, the wobble estimator and the pre-positioner.

Further, in accordance with a preferred embodiment of the present invention, the spinner comprises a plurality of facets and the beam misalignment corrector additionally includes apparatus for correcting in accordance with the current operative facet.

Still further, in accordance with a preferred embodiment of the present invention, the beam misalignment corrector additionally includes a smoother for moving the light beam from a final location of a current scan line scanned with a current facet of the spinner to a first estimated location of a next scan line, wherein the first estimated location is the value of the pre-position signal measured when the next facet was last utilized.

Additionally, in accordance with a preferred embodiment of the present invention, the pre-positioner includes a closed loop control system controlling the beam shifter and operative to generally cancel the initial misalignment.

Moreover, in accordance with a preferred embodiment of the present invention, the pyramidal error estimator includes a misalignment function storer for storing a misalignment function and a multiplier receiving the pre-position signal for multiplying the misalignment function by the pre-position signal.

Further, in accordance with a preferred embodiment of the present invention, the wobble estimator includes a) a frequency detector which detects a spinning frequency of the spinner, b) a phase locked loop which produces a clock signal which is proportional to the spinning frequency and c) filters whose cutoff frequencies are adaptively defined by the clock signal for filtering a plurality of pre-position signals thereby to produce the second portion of the scanning misalignment.

There is also provided, in accordance with another preferred embodiment of the present invention, apparatus and method for filtering an output signal of a system in accordance with an operating frequency of the system, wherein the operating frequency changes over time. The apparatus includes a) a filter having at least one adaptively definable parameter for filtering the output signal, b) a detector for producing a measurement signal indicative of the operating frequency and c) a phase locked loop for producing a clock signal proportional to the measurement signal and for providing the clock signal to the filter thereby to define the at least one adaptively definable parameter. The method includes the steps performed by the apparatus.

There is further provided, in accordance with another preferred embodiment of the present invention, a method of laser scanning which includes the steps of a) reflecting a light beam having a light spot across a scanning line, b) measuring an initial misalignment of the light spot in a cross-scanning direction and c) during scanning, dynamically correcting scanning misalignment in accordance with the initial misalignment.

Additionally, in accordance with the second preferred embodiment of the present invention, the step of dynamically correcting includes the steps of a) determining a pre-position signal which offsets the initial misalignment, b) producing, from the pre-position signal, an estimated scanning misalignment due to wobble and pyramidal error and c) shifting the light beam in response to the estimated scanning misalignment thereby to correct the scanning misalignment.

Moreover, in accordance with the second preferred embodiment of the present invention, the step of producing includes the steps of a) estimating a first portion of the scanning misalignment due to pyramidal error and to an extent of wobble present at the beginning of the scanning line, b) estimating a second portion of the scanning misalignment caused by the wobble and c) summing the first and second portions with the pre-position signal.

Finally, in accordance with the second preferred embodiment of the present invention, the step of reflecting is performed with a spinner and the second step of estimating includes the steps of a) detecting a spinning frequency of the spinner, b) producing, via a phase locked loop, a clock signal which is proportional to the spinning frequency and c) filtering a plurality of pre-position signals with filters whose cutoff frequencies are adaptively defined by the clock signal.

BRIEF DESCRIPTION OF THE DRAWINGS

The present invention will be understood and appreciated more fully from the following detailed description taken in conjunction with the drawings in which:

FIGS. 2A and 2B illustrates errors in facet angle and FIG. 2C illustrates wobble;

DETAILED DESCRIPTION OF PRESENT INVENTION

Figure 1:
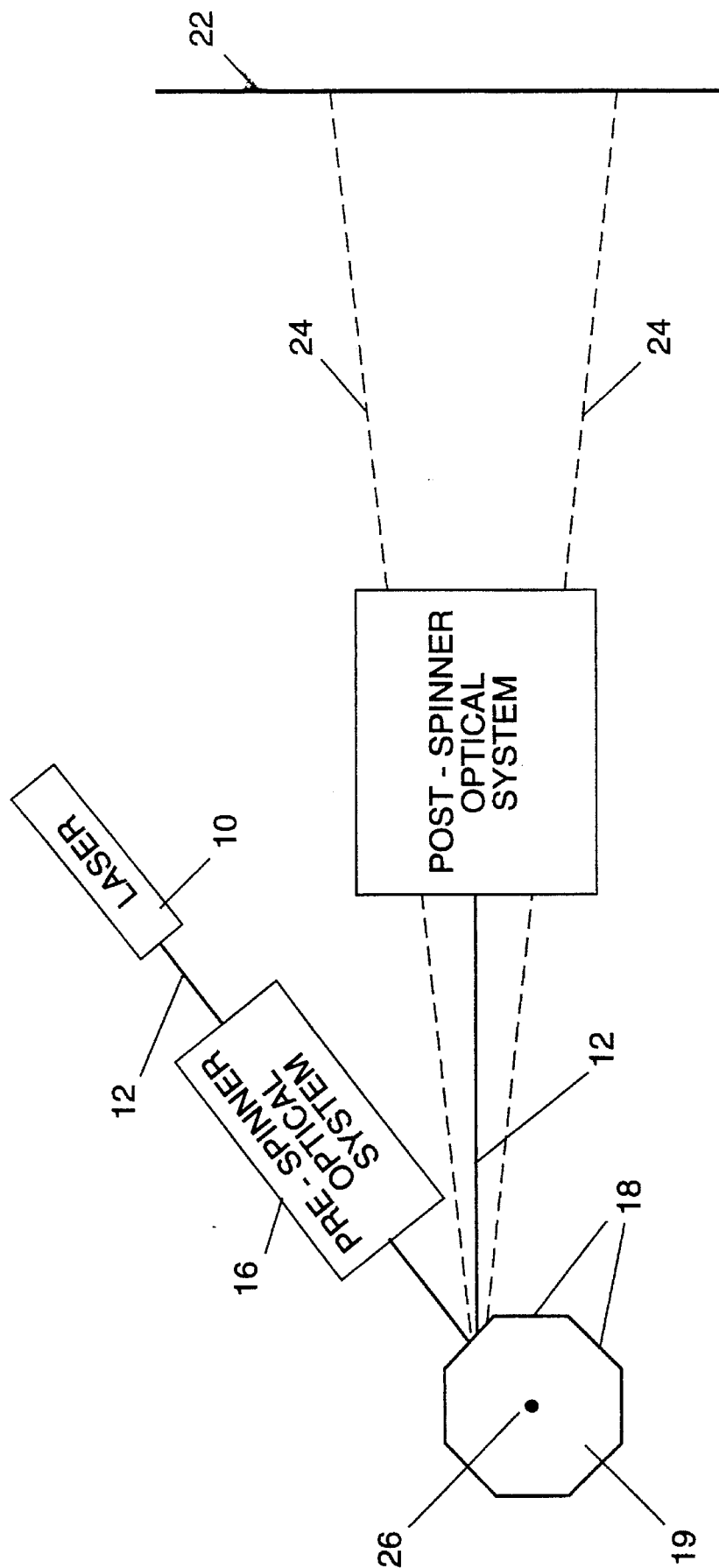
FIG. 1 is a part schematic, part block diagram illustration of prior art laser scanning devices.
Figure 2A:
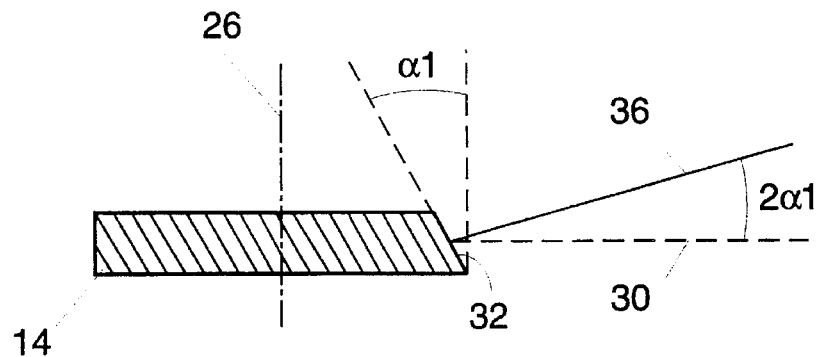
FIGS. 2A, 2B and 2C are schematic illustrations of sources of errors in scan lines in prior art laser scanning devices, where
Figure 2B:
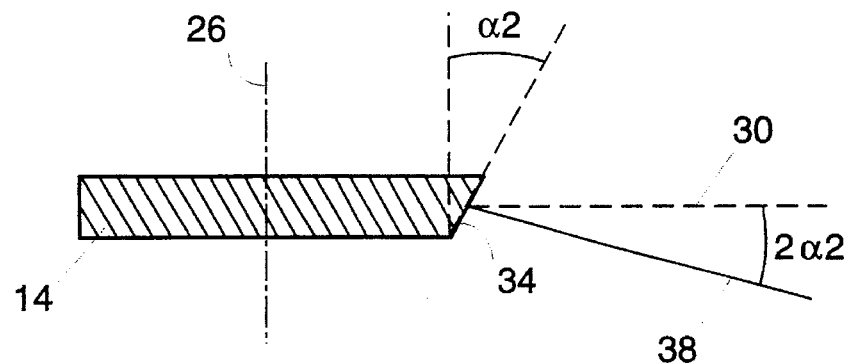
Figure 2C:
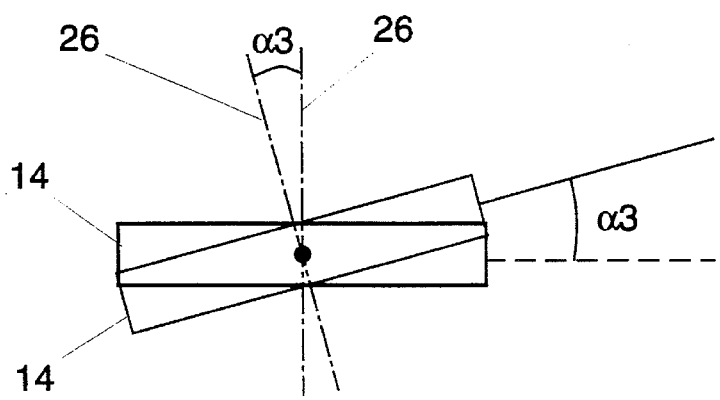
Figure 3A:
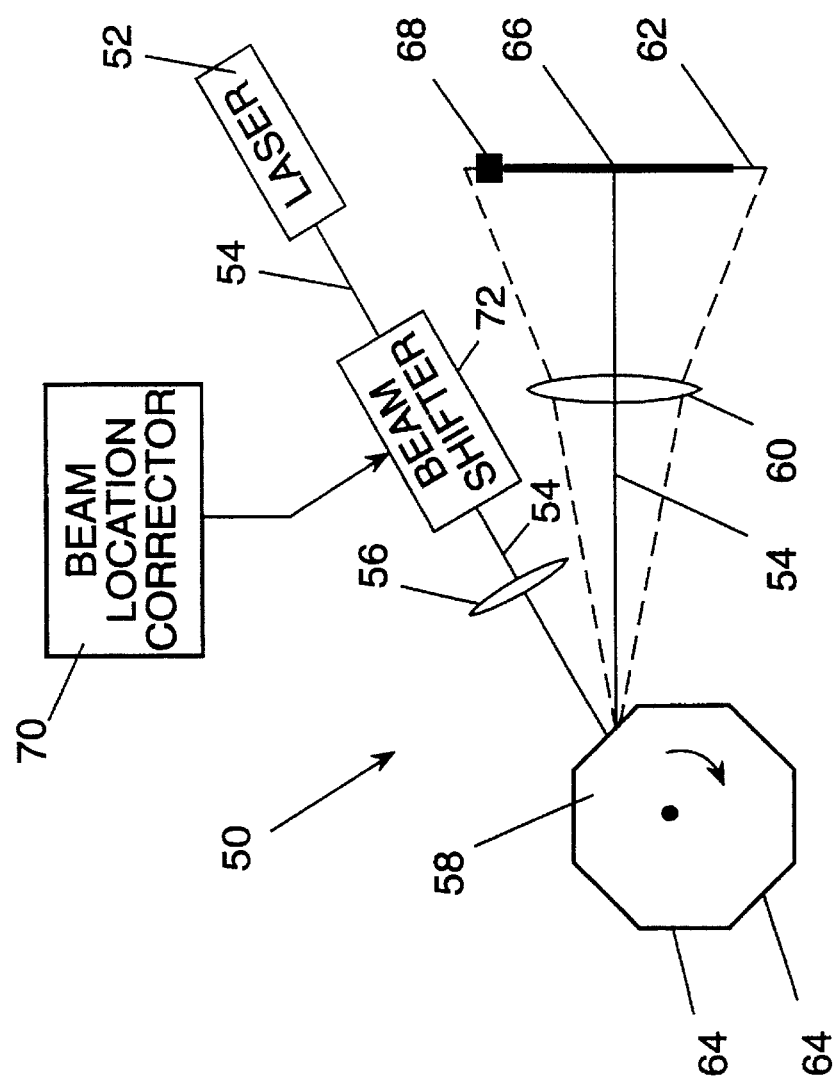
FIG. 3A is a part schematic, part block diagram top view illustration of a laser scanning device constructed and operative in accordance with a preferred embodiment of the present invention.
Figure 3B:
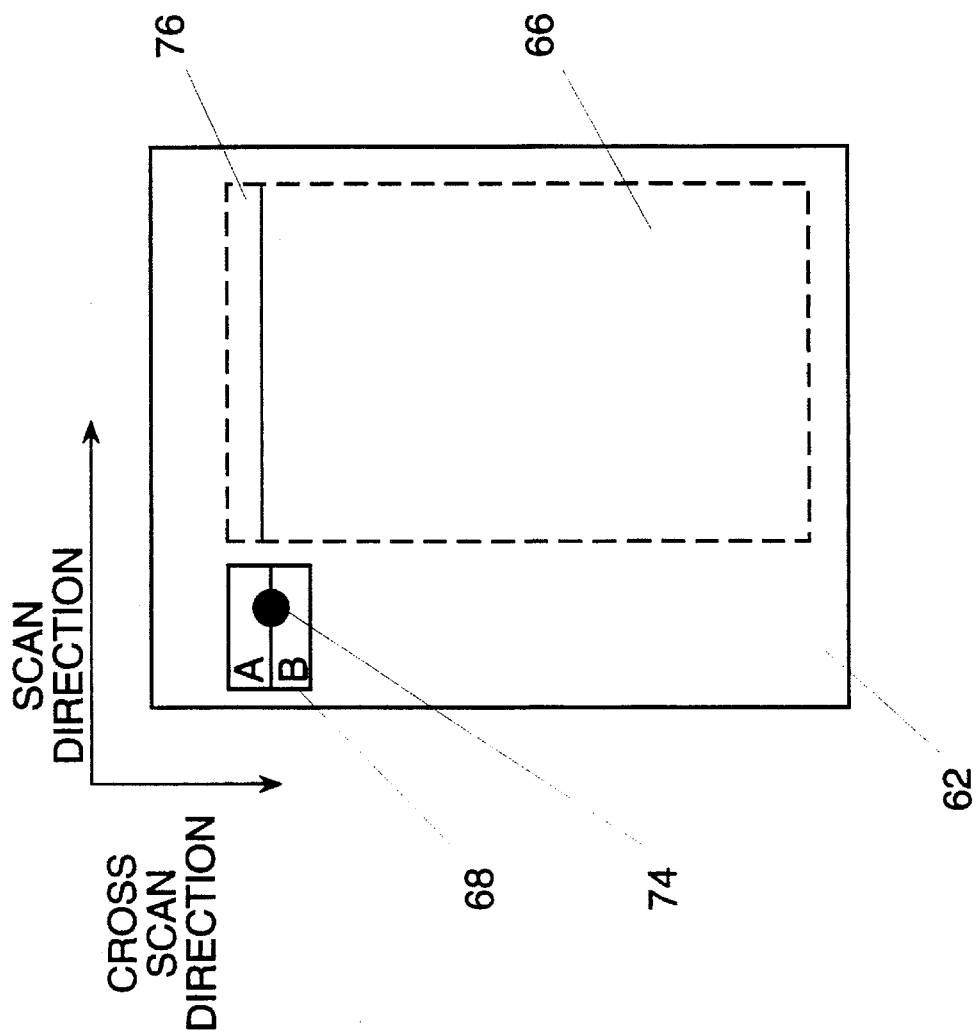
FIG. 3B is a schematic view, in the direction of arrow B of FIG. 3A, of the scanning surface of the laser scanning device of FIG. 3A.

Reference is now made to FIGS. 3A and 3B which illustrate the present invention. FIG. 3A illustrates an exemplary laser scanning device 50 constructed and operative in accordance with a preferred embodiment of the present invention and FIG. 3B illustrates the scanning surface of the system of FIG. 3A.

The laser scanning device 50 typically can be applied to any suitable laser scanning device. It will described in the context of the scanning device shown in FIG. 3A.

For example, the scanning device may comprise a laser source 52 which produces a laser beam 54, a pre-spinner optical system 56 represented by a lens and operative to shape and modify the beam 54 as necessary, a spinner 58, a flat-field lens 60 and a scanning surface 62 onto which the beam 54 is scanned by each facet 64 of the spinner 58.

Just outside an active scanning area 66, noted in FIG. 3A by a thick line and in FIG. 3B by dotted lines, is a light spot location detector 68 for detecting, for each scanning line, the initial misalignment of the spot of beam 54 in the cross-scanning direction.

Associated with the spot detector 68 is a beam misalignment corrector 70 operative to determine, from the output of detector 68 at the beginning of the scan line, misalignment correction signals for the entire scan line and to provide the misalignment correction signals to a beam shifter 72, located between the laser 52 and the scanning surface 62. The beam shifter 72 can be any suitable beam shifter, such as an acousto-optic deflector operating on a laser beam or a piezoelectric actuator operating on a fiber optic waveguide. As is known in the art, the acousto-optic deflector has a much faster response time than that of the piezoelectric actuator.

Spot detector 68 is attached to a chassis (not shown) upon which the beam shifter 72, optical system 56, spinner 58 and flat field lens 60 are located. As is known in the art, the chassis can move along surface 62 in the cross-scan direction of the chassis can remain fixed and the surface 62 can move.

In accordance with the present invention, the spot detector 68 is a standard bi-cell detector, such as the SPOT-2D detector from UDT Sensors, Inc. of Hawthorne, Calif., U.S.A. The spot detector 68 measures the extent to which a spot 74 of beam 54 is not centered with respect to a line 76 to be written.

To do so, the spot detector 68 measures the intensity of the light shining on each half, labeled A and B. If both halves have the same intensity, the beam is centered. Otherwise, the beam is off-centered in either the A direction (i.e. A has a greater intensity) or the B direction.

In accordance with the present invention and as described in detail hereinbelow, from the misalignment measured by the spot detector 68, which is the misalignment at the beginning of the scan line 76, the beam misalignment corrector 70 determines and implements the necessary corrections of the beam 54 over the line 76 to be scanned. The process is repeated for each line to be scanned, each of which corresponds to a different facet 64.

Figure 4:
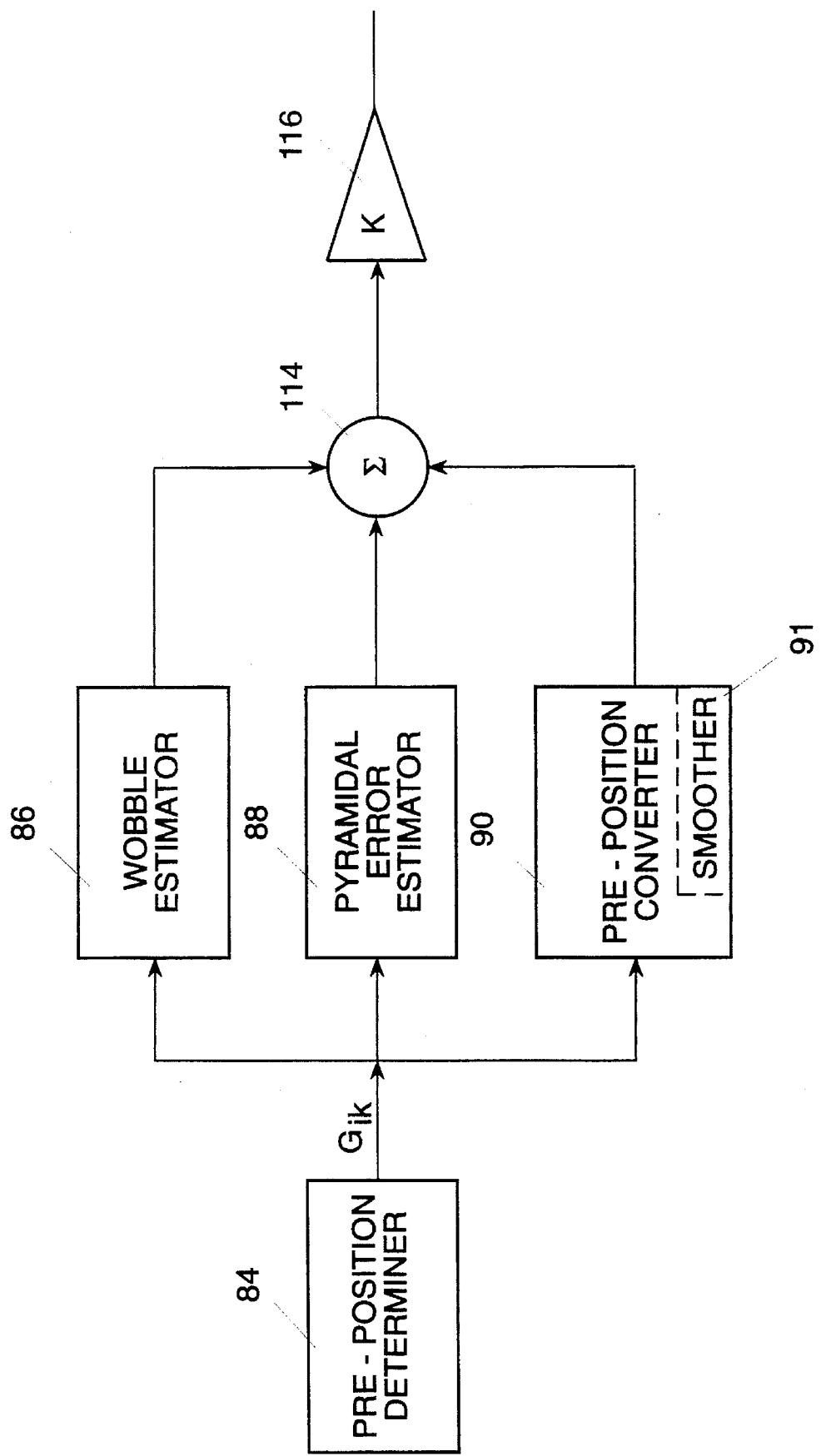
FIG. 4 is a block diagram illustration of elements of a beam location corrector, constructed and operative in accordance with a preferred embodiment of the present invention and useful in the system of FIG. 3A.
Figure 5:
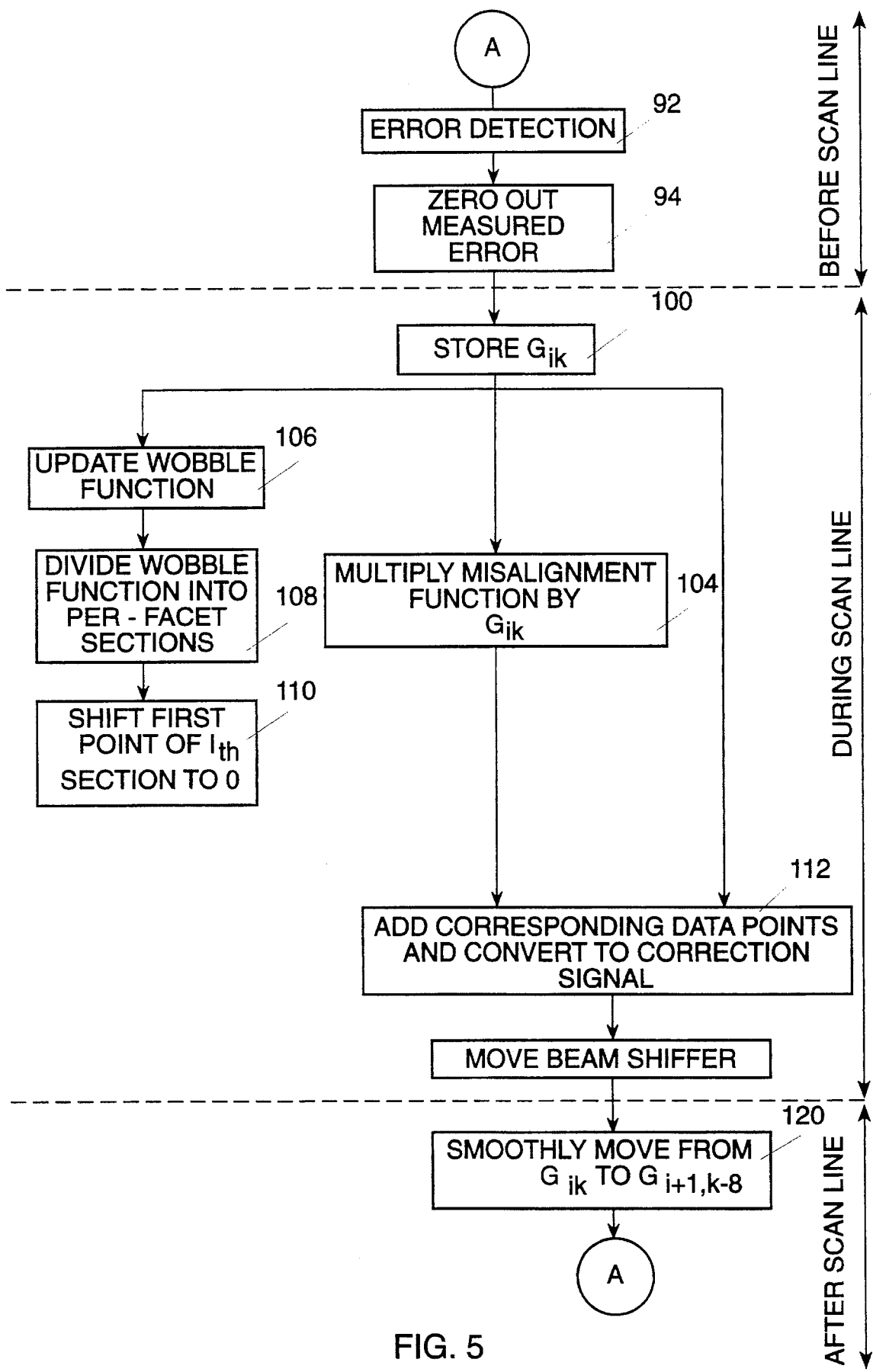
FIG. 5 is a flow chart illustration of the operations of the beam location corrector of FIG. 4 within the laser scanning device of FIG. 3A, the method being operative in accordance with a preferred embodiment of the present invention.

Reference is now made to FIG. 4 which illustrates the elements of the beam misalignment corrector 70, to FIG. 5 which illustrates the method performed by corrector 70 as part of a feedback loop defined by corrector 70, beam shifter 72 and spot detector 68 and to FIGS. 6A–6G which are useful in understanding the method of FIG. 5.

Figure 6A:
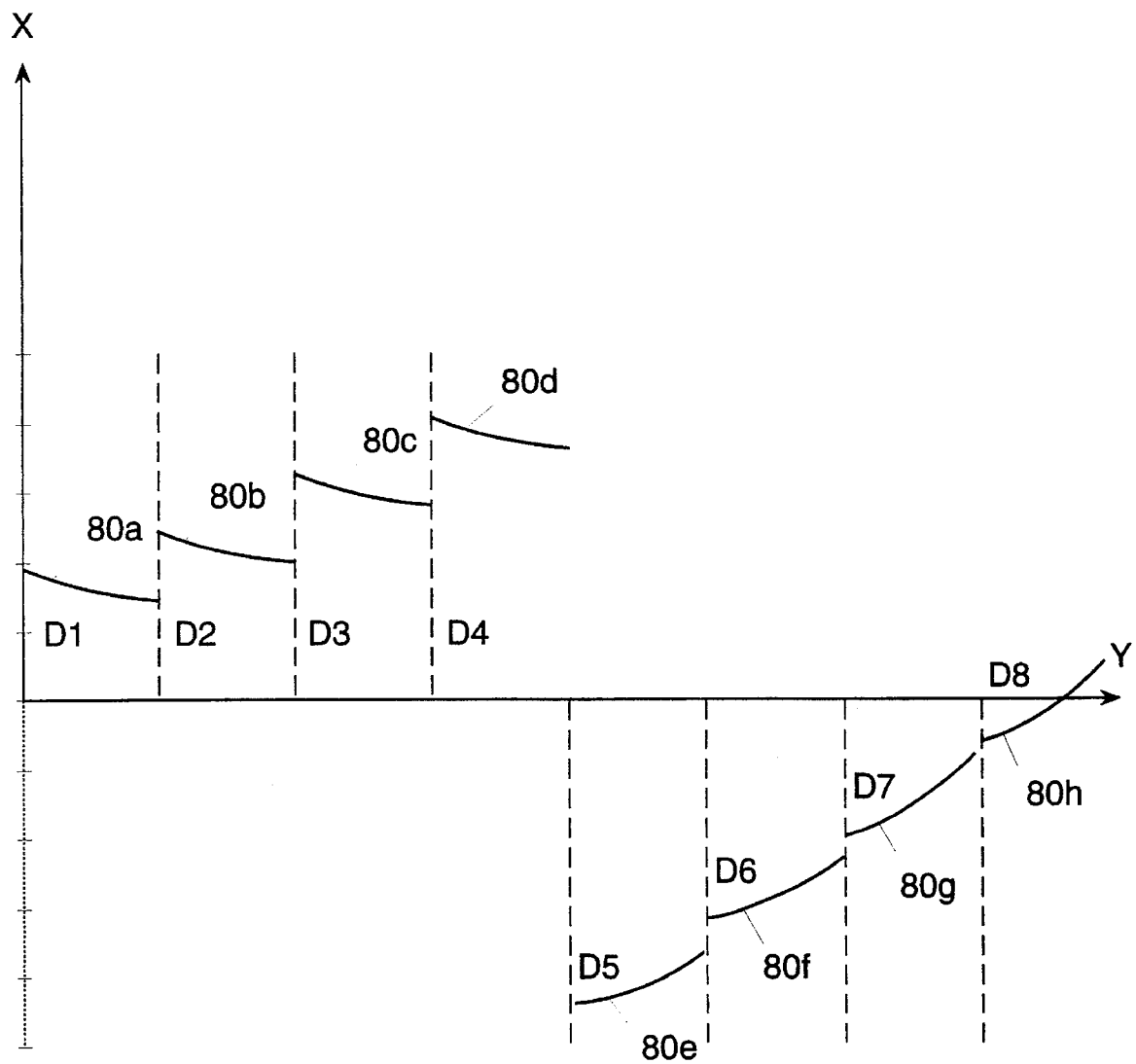
FIG. 6A is a graphical illustration of non-corrected locations of the laser beam across a scan line for the facets of the polygon.
Figure 6B:
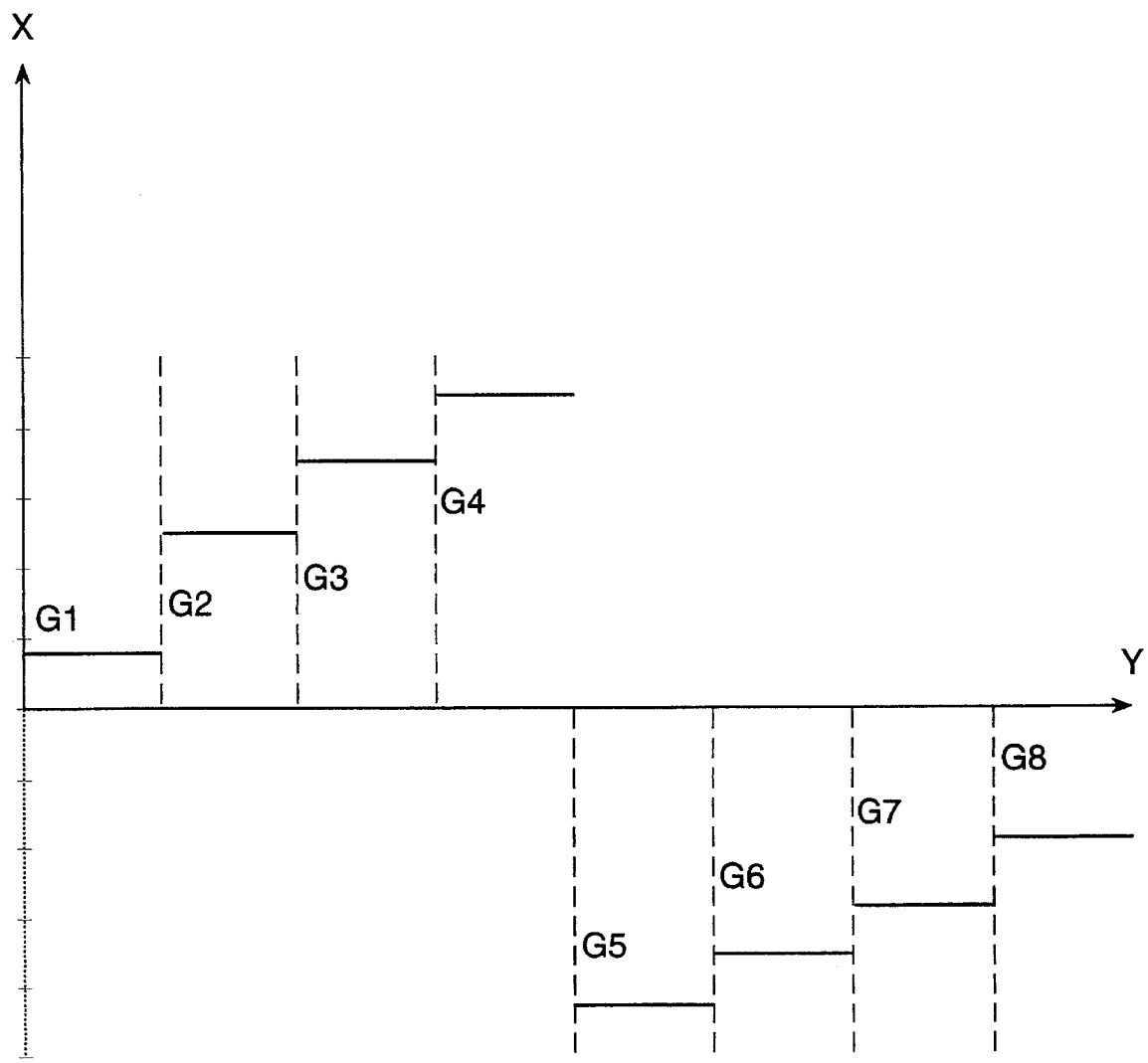
FIG. 6B is a graphical illustration of a pre-position signal for the facets of the polygon.

FIG. 6A is a generalized graph of the location of the beam 54 for eight facets 64, comprised of eight misalignment curves 80. The horizontal axis, denoted Y (scanning direction), is the line along which the beam 54 ideally should scan, assuming that no wobble or pyramidal error exists. It is noted that eight scan lines are shown in most of FIGS. 6.

The offsets Di, where i refers to a facet of the spinner, are the misalignments measured by the spot detector 68 at the start of each scan line and include in them offset errors due to pyramidal error and wobble.

The beam location corrector 70 operates to correct the beam location such that curves 80 become straight lines along the Y axis. To do so, for each kth scan line and each ith facet, the corrector 70 first determines a pre-position value Gi,k which brings Di,k close to 0 and then estimates, from Gi,k, the shape of the correction curve which corrects for the relevant curve 80, where the shape of the correction curve is a function of the wobble and the pyramidal error.

The beam location corrector 70 therefore typically comprises a pre-position determiner 84 (FIG. 4), a wobble estimator 86, a pyramidal error estimator 88 and a pre-position converter 90. Converter 90 can also optionally comprise a smoother 91 to provide a smooth motion from the end of one correction curve to the beginning of the next. Smoother 91 is particularly useful if the beam shifter is a relatively slow device.

The block diagram of FIG. 4 does not capture the entire operation of the corrector 70; however, the method described in FIG. 5 does.

The pre-position determiner 84 performs steps 92–94 (FIG. 5) at the beginning of each scan line to determine the pre-position value Gi,k.

In step 92, the output of detector 68, for a given line, is converted to an offset signal e, defined as a normalized error, or:

$$e=(A-B)/(A+B) \tag{1}$$

where A and B are the intensity levels respectively measured by halves A and B.

In step 94, the pre-position determiner 84 controls the beam shifter 72 so as to generally zero out the error signal e. Thus, although not shown, step 94 is a control system loop in which the error signal e is continually measured and beam shifter 72 is continually actuated to reduce the error signal.

When the error signal has a value within a predetermined threshold value near zero, the preposition determiner 84 stops operation and the value of the correction signal is typically digitized (step 100) and stored as the preposition value $G_{i,k}$. The preposition values for the signal of FIG. 6A are given in FIG. 6B.

It is noted that the operation of the pre-position determiner 84 should occur before the laser beam reaches the beginning of the scan line. If the pre-position determiner 84 cannot operate quickly enough, the operation can be performed over a number of scan lines which are scanned by the same facet.

The value of $G_{i,k}$ is provided, at the beginning of the kth scan line, to each of elements 86–90 (FIG. 4) for processing and their combined output is the estimation signal for the kth scan line error as scanned by facet i.

Figure 6C:
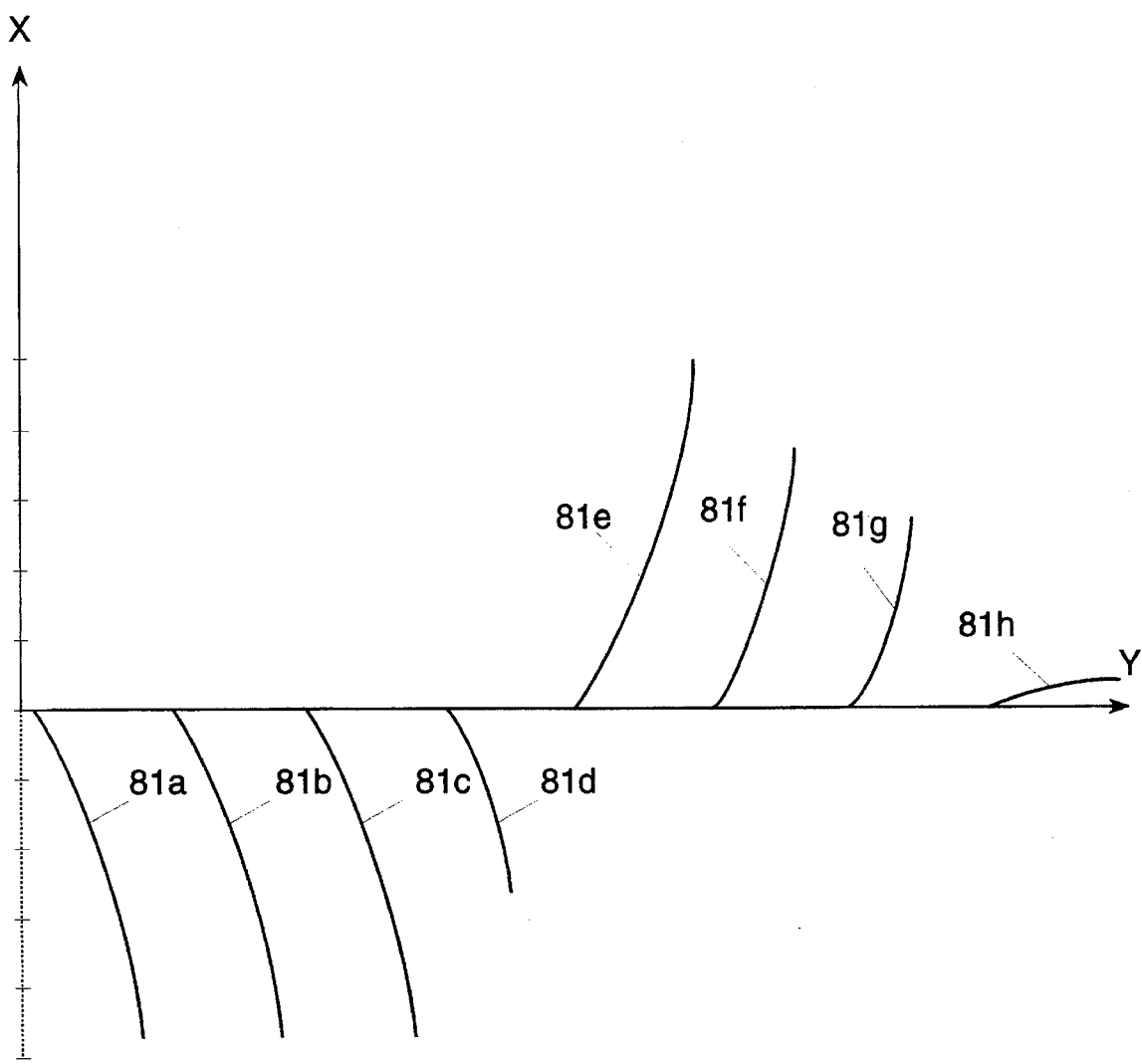
FIG. 6C is a graphical illustration of the location of the laser beam across a scan line, after correction with the pre-position signal of FIG. 6B.

In step 102, pre-position converter 90 continuously provides the value of $G_{i,k}$. If only the pre-position converter 90 operated (i.e. if only the pre-position value $G_{i,k}$ was used for correction), the laser beam would scan as shown in FIG. 6C. As can be seen, the laser beam would begin scanning at the correct location but would become skewed over the course of the scan line. After pre-position correction, the curves are still misaligned along the scan line and they contain within them some wobble.

It is noted that the extent of misalignment (ignoring the wobble) in the curves, labeled 81, of FIG. 6C generally corresponds to the extent of the corresponding pre-position value $G_{i,k}$. Thus, curve $81e$ has a much larger average slope than curve $81h$ corresponding due to the fact that $G_{5,k}$ is much larger than $G_{8,k}$. The curves can be estimated by determining both the pyramidal error and the wobble.

A misalignment function describing the effect of a known pyramidal error on the location of a laser beam throughout a scan line can be calculated for the laser scanning device in which the present invention is placed through application of the physics of the optical elements. Software packages, such as Oslo by Sinclair Optics of Rochester, N.Y. U.S.A., can be utilized to determine, from the known pyramidal error, the relationship between the scanning location, the cross-scanning error measured by the pre-position signal $G_{i,k}$ and the location of the light beam on the scanning surface, for each datapoint on a scan line.

Figure 6D:
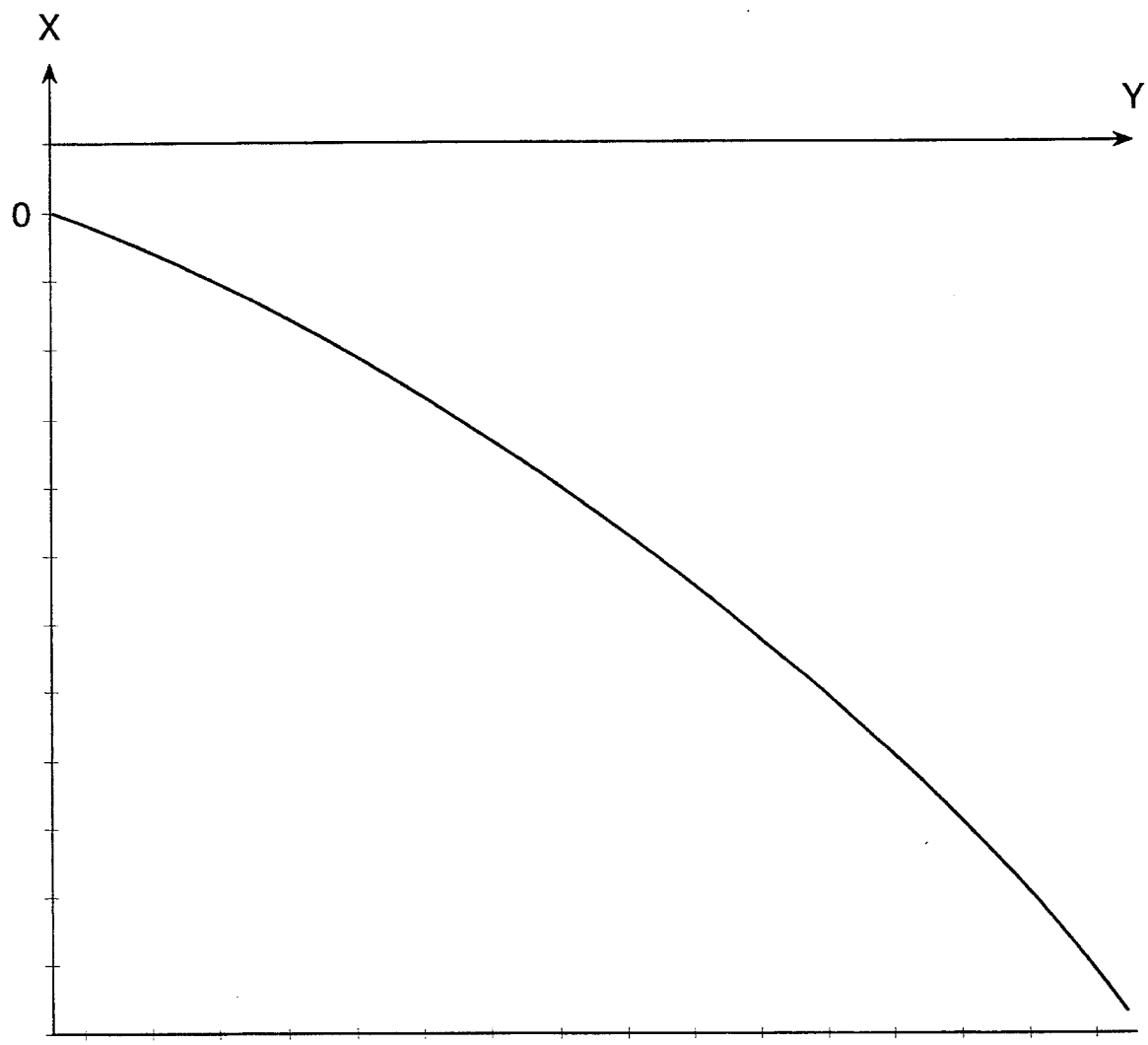
FIG. 6D is a graphical illustration of a misalignment function due to pyramidal error.
Figure 6E:
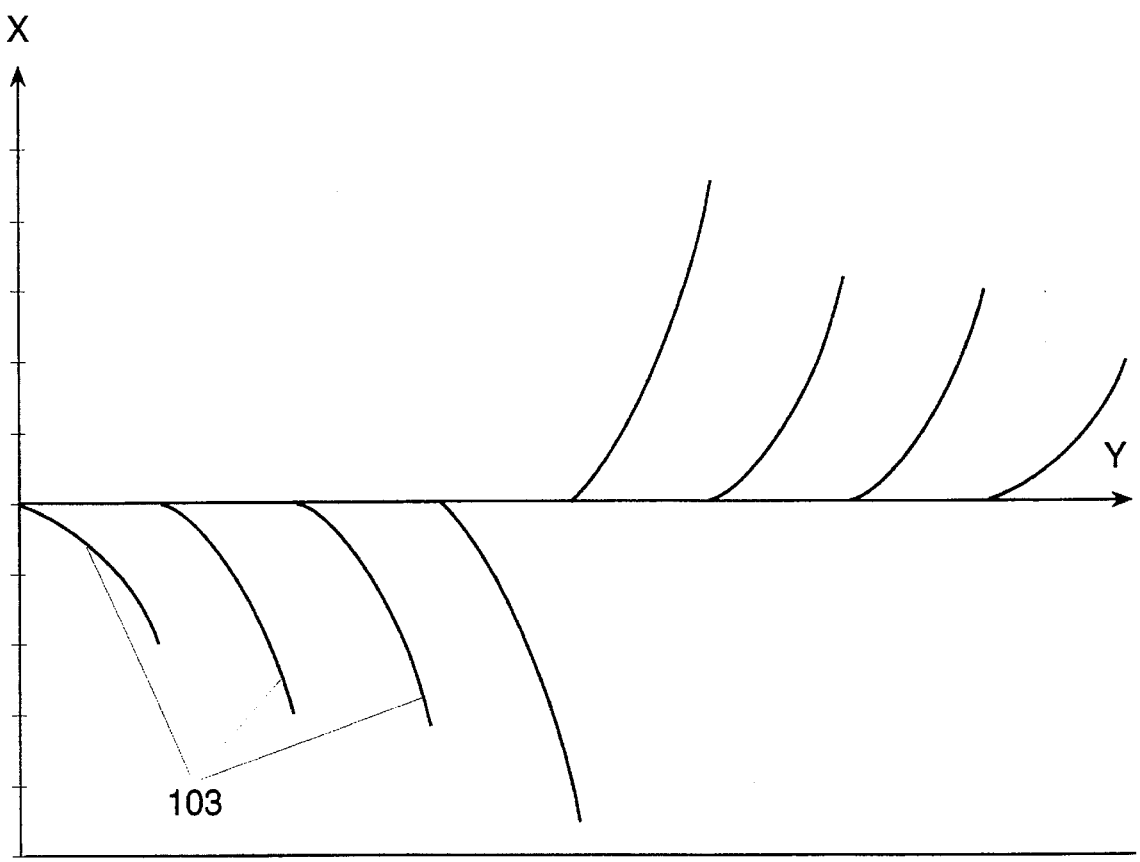
FIG. 6E is a graphical illustration of an estimation of the signal of FIG. 6C using the function of FIG. 6D multiplied by the preposition signal of FIG. 6B.

An exemplary misalignment function is provided in FIG. 6D wherein the scale of the figure is significantly different than that of the remaining graphs of FIG. 6. In step 104, the pyramidal error estimator 88 estimates the misalignment primarily due to pyramidal error by multiplying each of the datapoints of the misalignment function of FIG. 6D by $G_{i,k}$. The output of step 104 is the estimation curves 103 of FIG. 6E.

The wobble estimator 86 is operative to estimate the frequency and amplitude of the wobble from a series of input pre-position signals $G_{i,k}$ and to construct therefrom an estimated wobble signal. It is noted that the estimated wobble signal must have the same phase as the spinner 14.

Figure 6F:
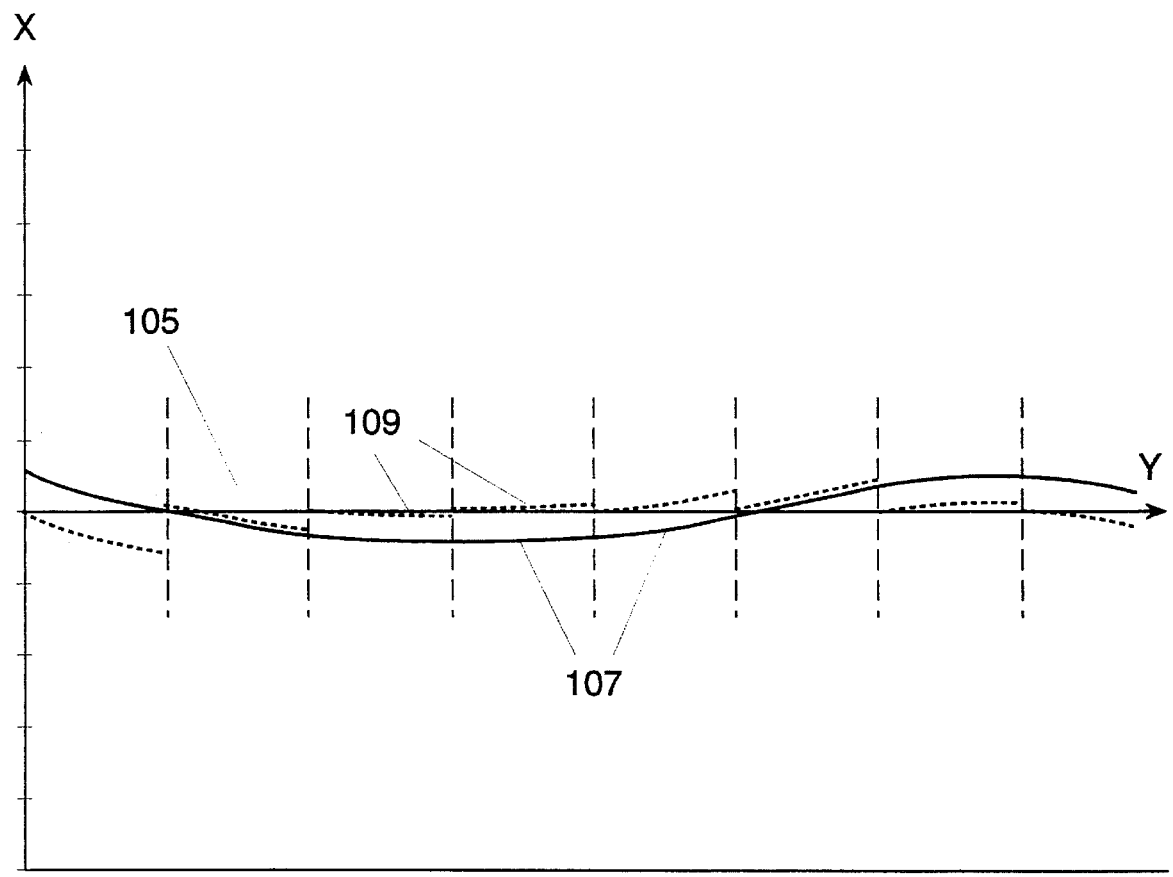
FIG. 6F is a graphical illustration of an estimate of the wobble of the polygon.
Figure 6G:
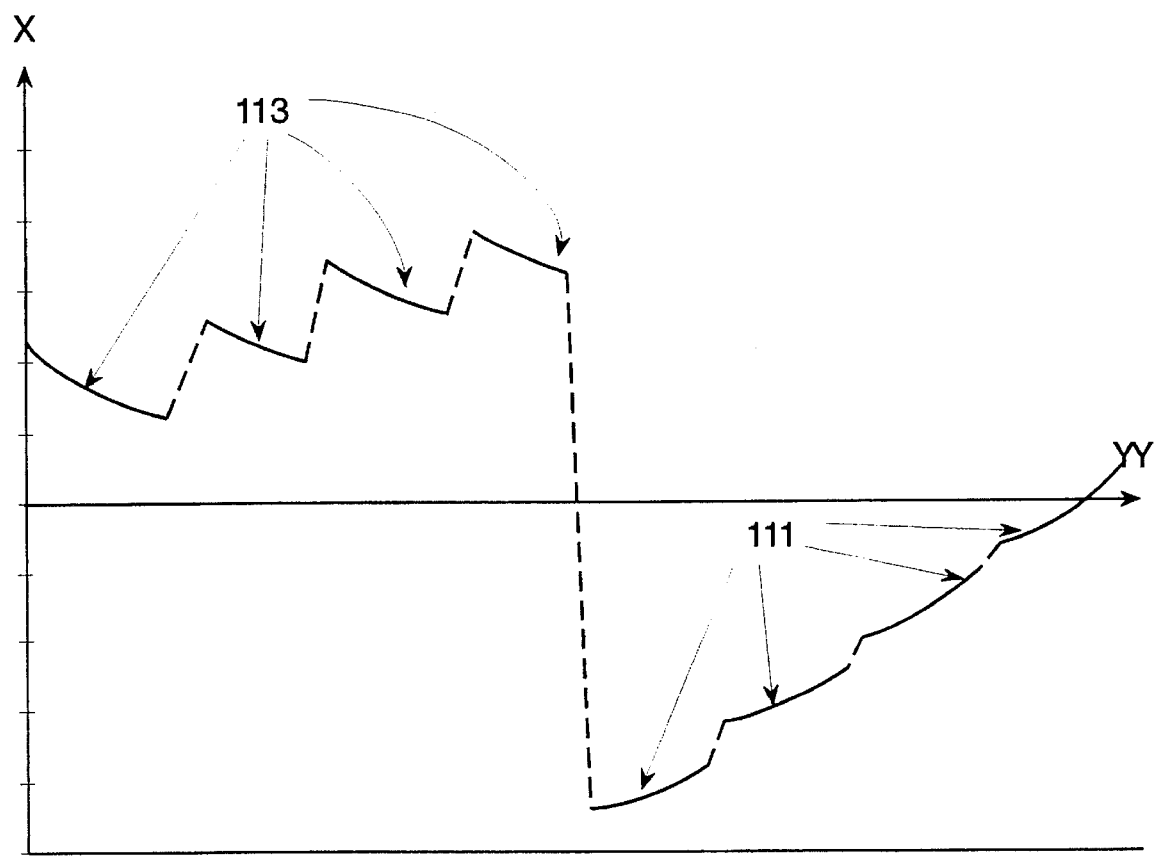
FIG. 6G is a graphical illustration of an estimate of the signal of FIG. 6A.

FIG. 6F illustrates one revolution of the estimated wobble signal 105 produced in step 106 (FIG. 5). The revolution of the wobble signal 105 occurs during one revolution of the spinner 14 and thus, only a portion 107 of signal 105 is operative for each facet i.

In step 108, the appropriate portion 107, based on the current value of i, is selected when the pre-position value $G_{i,k}$ is determined. Portion 107 is typically comprised of a plurality of datapoints corresponding to the number of datapoints in a scan line.

In step 110, the value of the first datapoint of the selected portion 107 is determined and subtracted from each of the datapoints in portion 107. Thus, step 110 shifts the portion 107 towards the Y scanning axis, providing shifted signals 109.

For each datapoint on the kth scan line corresponding to the ith facet, step 112 adds the corresponding value of shifted portion 107, of estimation curve 103 and of the current value of $G_{i,k}$ to produce an estimation curve 111 (FIG. 6G) of the signal of FIG. 6A. Step 112 also multiplies the estimation curve by an appropriate factor to produce a correction signal for the beam shifter 72 for that datapoint. A summer 114 (FIG. 4) and an amplifier 116 performs step 112.

Because consecutive pre-position values $G_{i,k}$ are significantly different, the movement of the beam shifter 72 due to the change from the ith facet 64 to the (i+1)th facet 64 might not be smooth. Thus, pre-position converter 90 optionally includes smoother 91 to smooth the motion from one pre-position value to the next. Smoother 91 is not necessary if the reaction time of the beam shifter is fast enough. The output of smoother 91 is shown in FIG. 6H as sections 113.

Smoother 91 receives, in step 120, the current pre-position value $G_{i,k}$ and the pre-position value $G_{i+1,k-8}$ for the next facet as calculated the previous time the (i+1)th facet was utilized, for spinners with eight facets. The smoother 91 operates only at the end of the scan line 76.

After step 120, the method returns to step 92 and begins operation for the next facet and the next scan line 76.

Figure 7A:
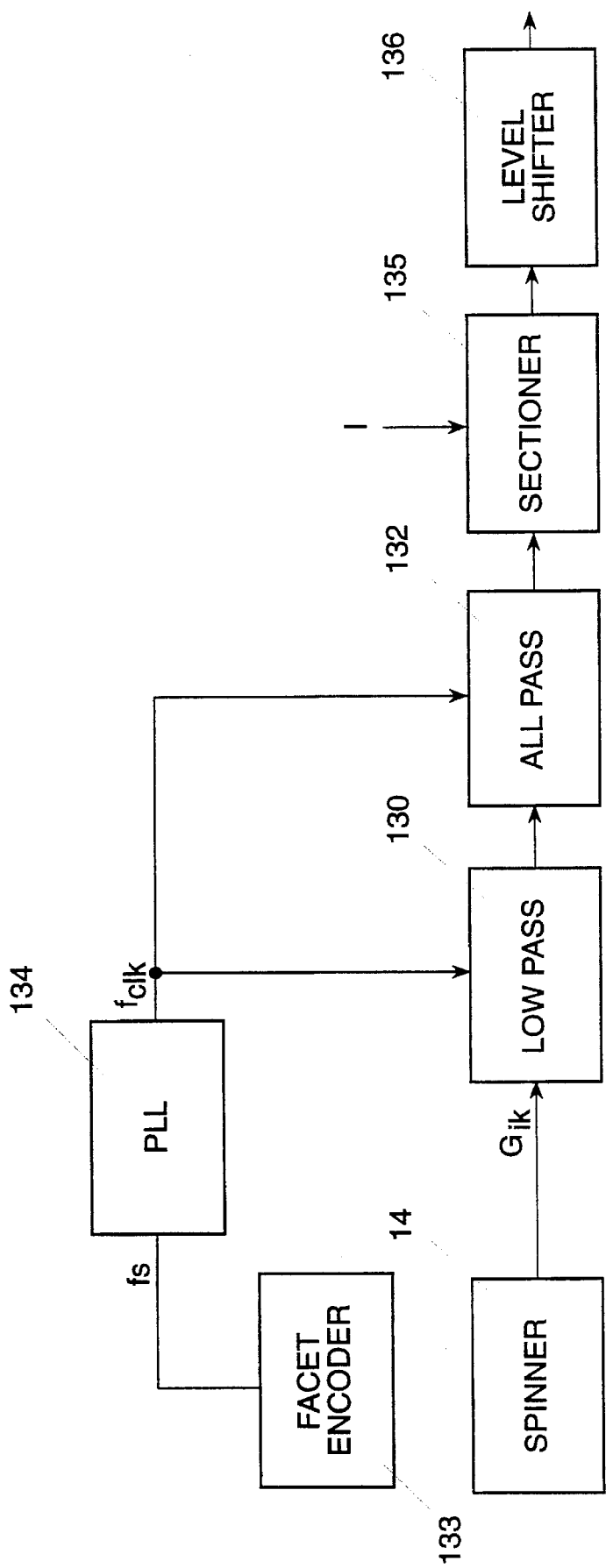
FIG. 7A is a block diagram illustration of a wobble estimator forming part of the beam location corrector of FIG. 4.
Figure 7C:
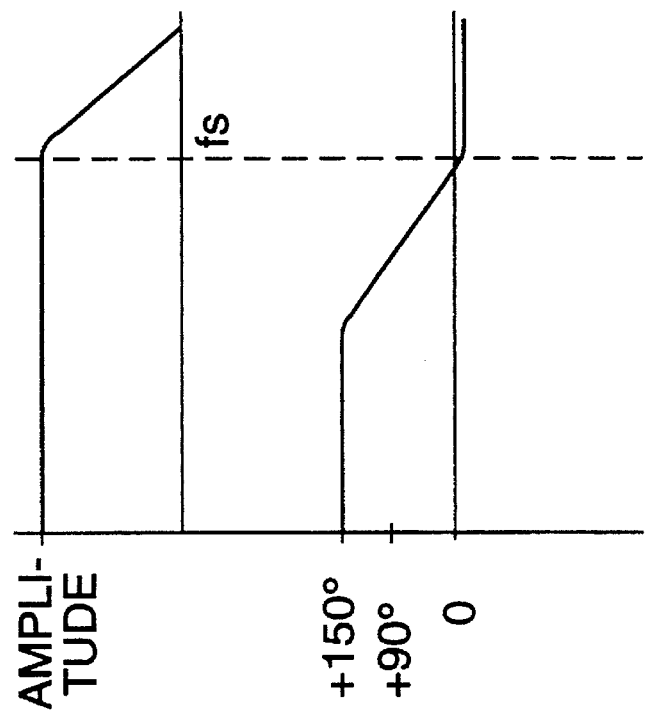
FIGS. 7B and 7C are graphical illustrations of the frequency responses of elements of the element of FIG. 7A.
Figure 7B:
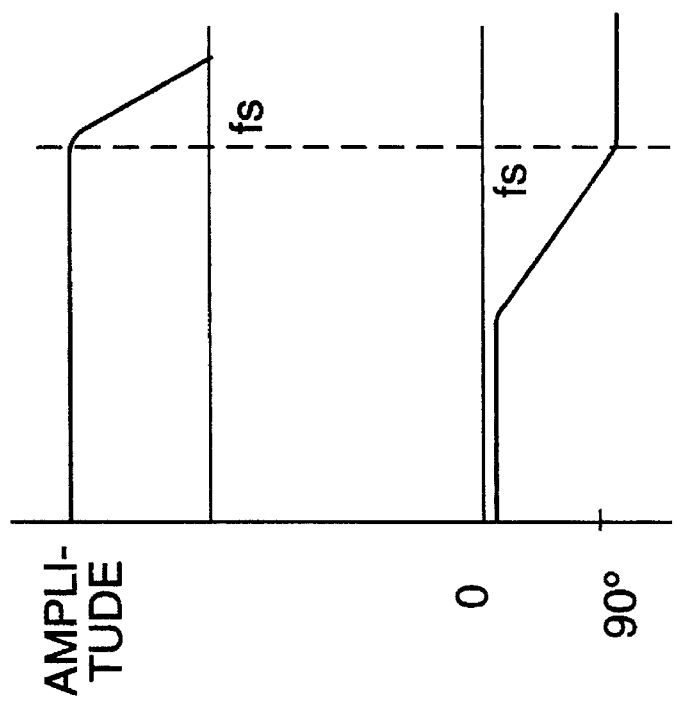

Reference is now made to FIGS. 7A–7C which illustrate an exemplary embodiment of the wobble estimator 86 and the frequency responses of its constituent elements.

The wobble estimator 86 typically comprises a low pass filter 130 for filtering the pre-position data $G_{i,k}$. The frequency response of low pass filter 130 is shown in FIG. 7B. Filter 130 passes only those frequencies less than or equal to the spinner rotation frequency Fs; however, it adds a phase delay to the output signal.

Thus, estimator 86 additionally comprises an all pass filter 132, whose frequency response is shown in FIG. 7C, for canceling the phase delay introduced by filter 130.

The spinner frequency Fs, which is typically the cutoff frequency of filters 130 and 132, is continuously measured by a facet index detector 133 and provided to a phase locked loop (PLL) 134. PLL 134 provides a clock frequency Fclk to filters 130 and 132 in order to lock their cutoff frequencies to that of the spinner frequency. Fclk is typically a fixed multiple of Fs and filters 130 and 132 typically divide their cutoff frequency input signal Fclk by the same fixed multiple; therefore, their cutoff frequencies are Fs.

Filters 130 and 132 are typically switched capacitor filters, such as the MF5 and MF10 filters manufactured by National Semiconductor of the U.S.A.

As mentioned hereinabove, the output of filter 132 is shown in FIG. 6F.

The wobble estimator 86 additionally includes a sectioner 135 for selecting the ith section of the estimated wobble signal of FIG. 6F (step 108 of FIG. 5) and a level shifter for shifting the beginning of the ith section to the horizontal axis (step 110 of FIG. 5) where the beginning is defined as the moment that the pre-position value $G_{i,k}$ is determined.

Figure 7D:
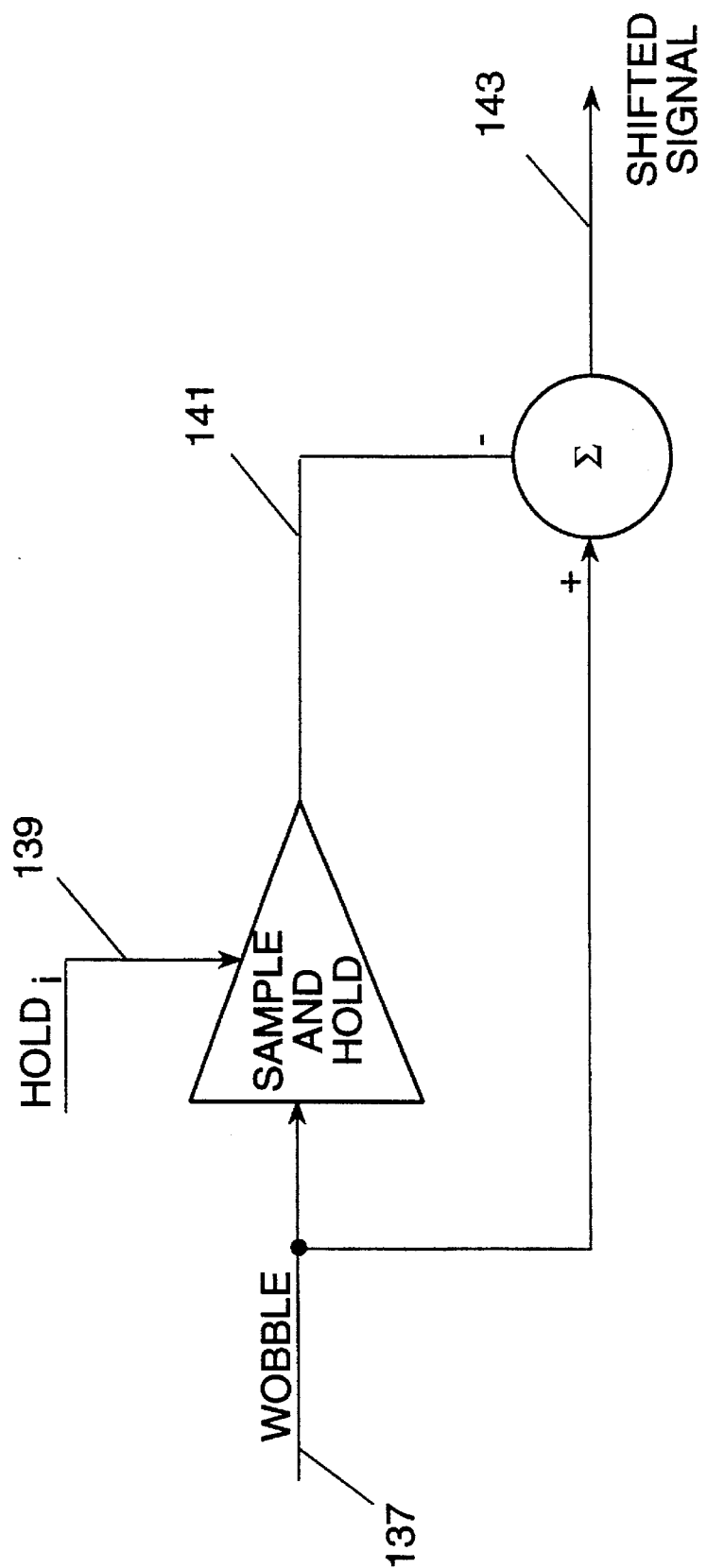
FIG. 7D is a circuit diagram illustration of a sectioner, forming part of the wobble estimator of FIG. 7A.
Figure 7E:
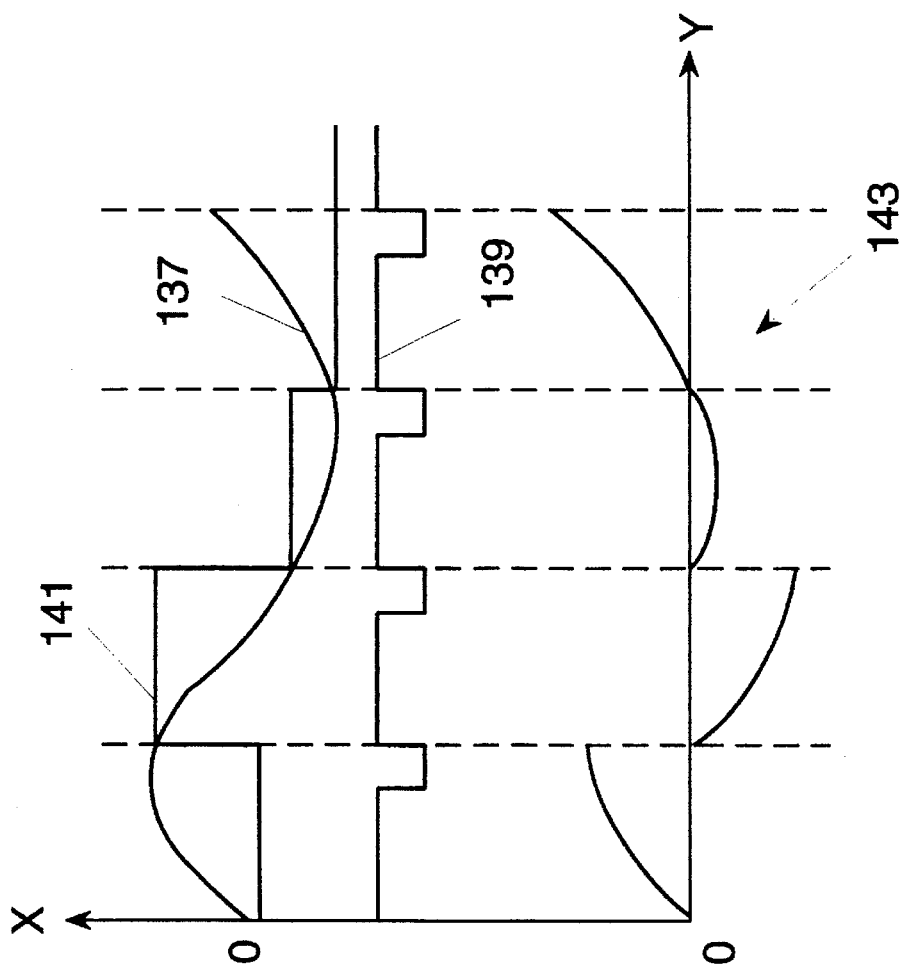
FIG. 7E is a graphical illustration of output signals from elements of the circuit of FIG. 7D.

Reference is now briefly made to FIGS. 7D and 7E which respectively illustrate an exemplary circuit for sectioner 135 and the signals labeled in FIG. 7D as 137, 139, 141 and 143. The circuit and signals are believed to be self-explanatory and therefore, in the interest of conciseness, will not be described herein.

It will be appreciated that the wobble can also be measured for a system having a spinner of between one and five facets. In this system, a second spot detector 68 is placed at the end of a scan line, outside of the scanning area 66.

In this alternative embodiment, the output of the second detector 68 is provided as input only to the wobble estimator 86 and not to the pyramidal error estimator 88.

Figure 8:
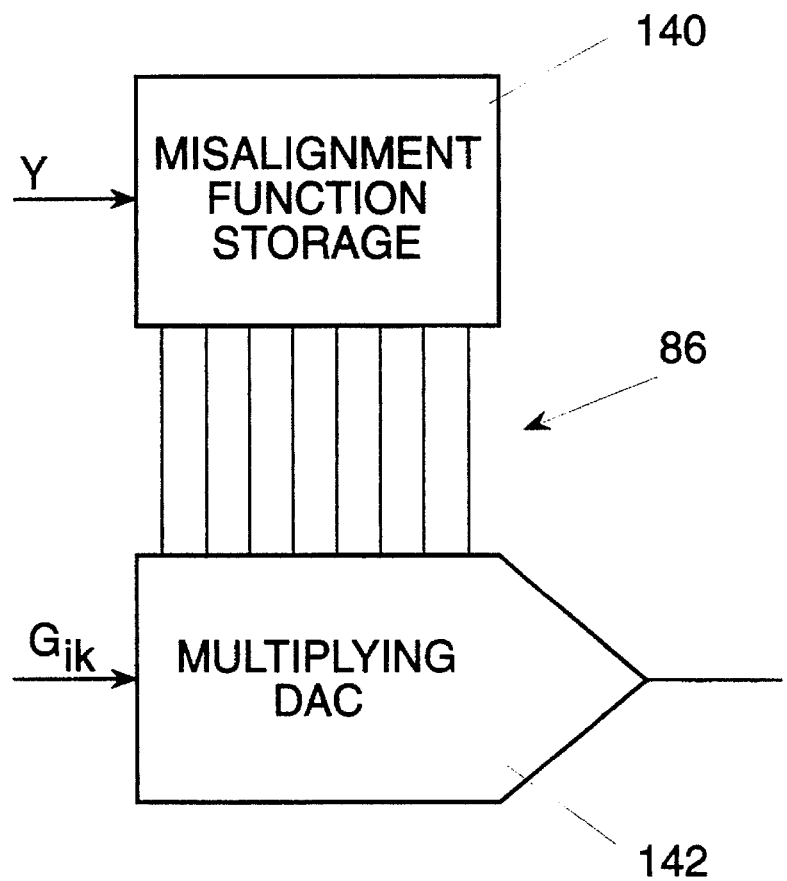
FIG. 8 is a block diagram illustration of a pyramidal error estimator forming part of the beam location corrector of FIG. 4.

FIG. 8 illustrates an embodiment of the pyramidal error estimator 88, for a non necessarily linear misalignment function. In this embodiment, estimator 88 comprises a storage unit 140 for storing a digitized version of the misalignment function and for receiving a Y location of the scan line 76 from a scanning clock (not shown). Estimator 88 also comprises a multiplying digital-to-analog converter (DAC) 142 for multiplying the current pre-position value Gi,k by the value of the misalignment function at the Y location, thereby producing the estimated signal shown in FIG. 6E.

Figure 9:
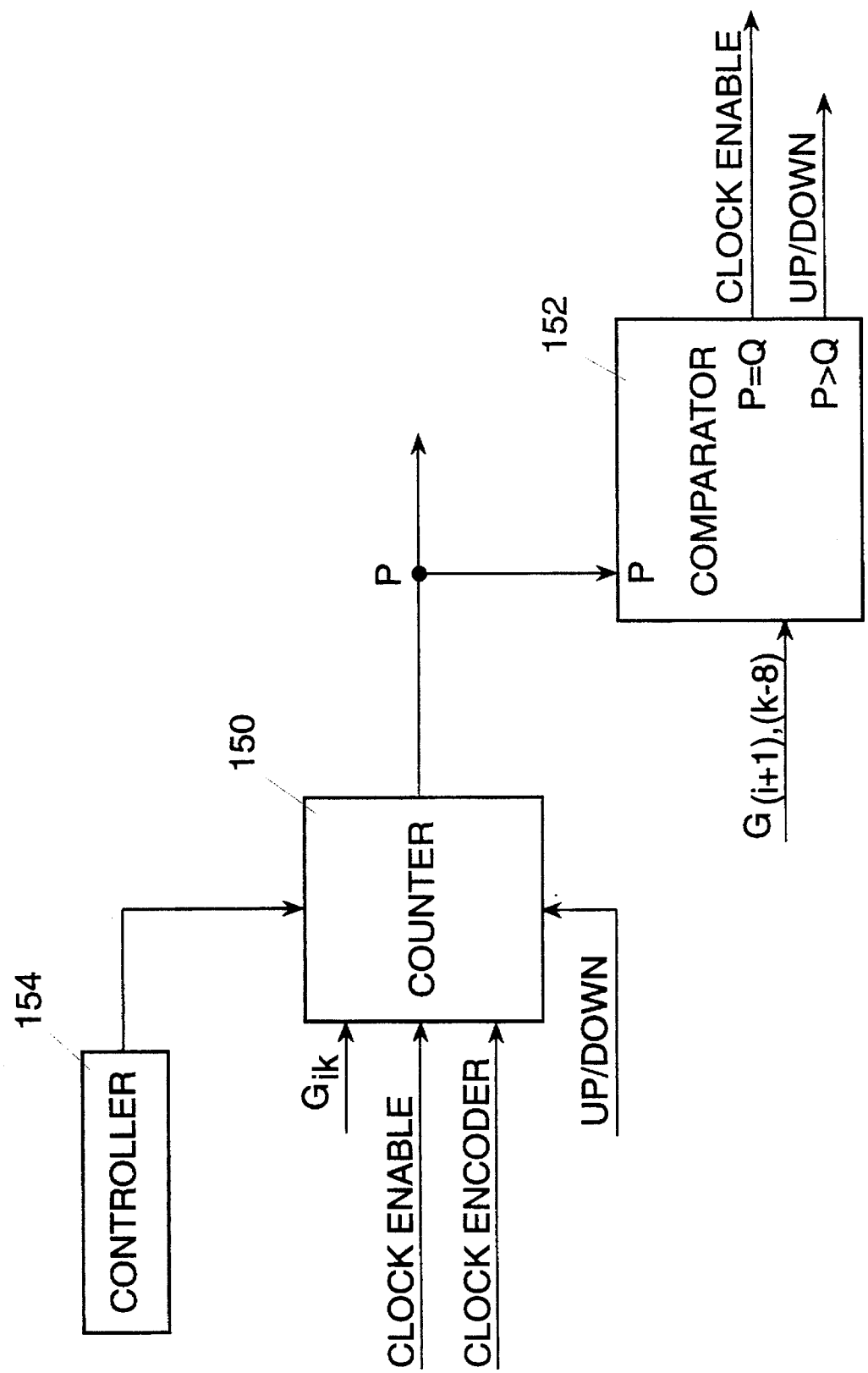
FIG. 9 is a block diagram illustration of a smoother forming part of the beam location corrector of FIG. 4.

Reference is now made to FIG. 9 which illustrates an exemplary embodiment of smoother 91 for a piezo-electric actuator type of beam shifter 72. The specific design of smoother 91, however, depends on the characteristics (e.g. bandwidth and impedance) of the beam shifter 72.

Smoother 91 comprises a counter 150, a comparator 152 and a controller 154. Upon receiving a start signal from controller 154, counter 150 accepts the current pre-position value Gi,k and changes it in accordance with control signals received from the comparator 152. The comparator 152 compares the next pre-position value Gi+1,k–8 to the output P of the counter 150 and, if the two values are not equal, indicates to the counter 150 to change the value of P based on the result of the comparison.

Otherwise, it provides a clock enable signal to counter 150, indicating that the present value of P is correct and is the value of Gi+1,k+1. At that point, controller 154 provides a stop signal to counter 150.

Counter 150 increases or decreases the value of P by one unit, where the unit is a multiple of the spinner frequency Fs, provided to the counter 150 via a clock encoder, PLL or any other element synchronized with the rotation of the spinner 14. The value of P is continually changed until it reaches the desired value.

Figure 10:
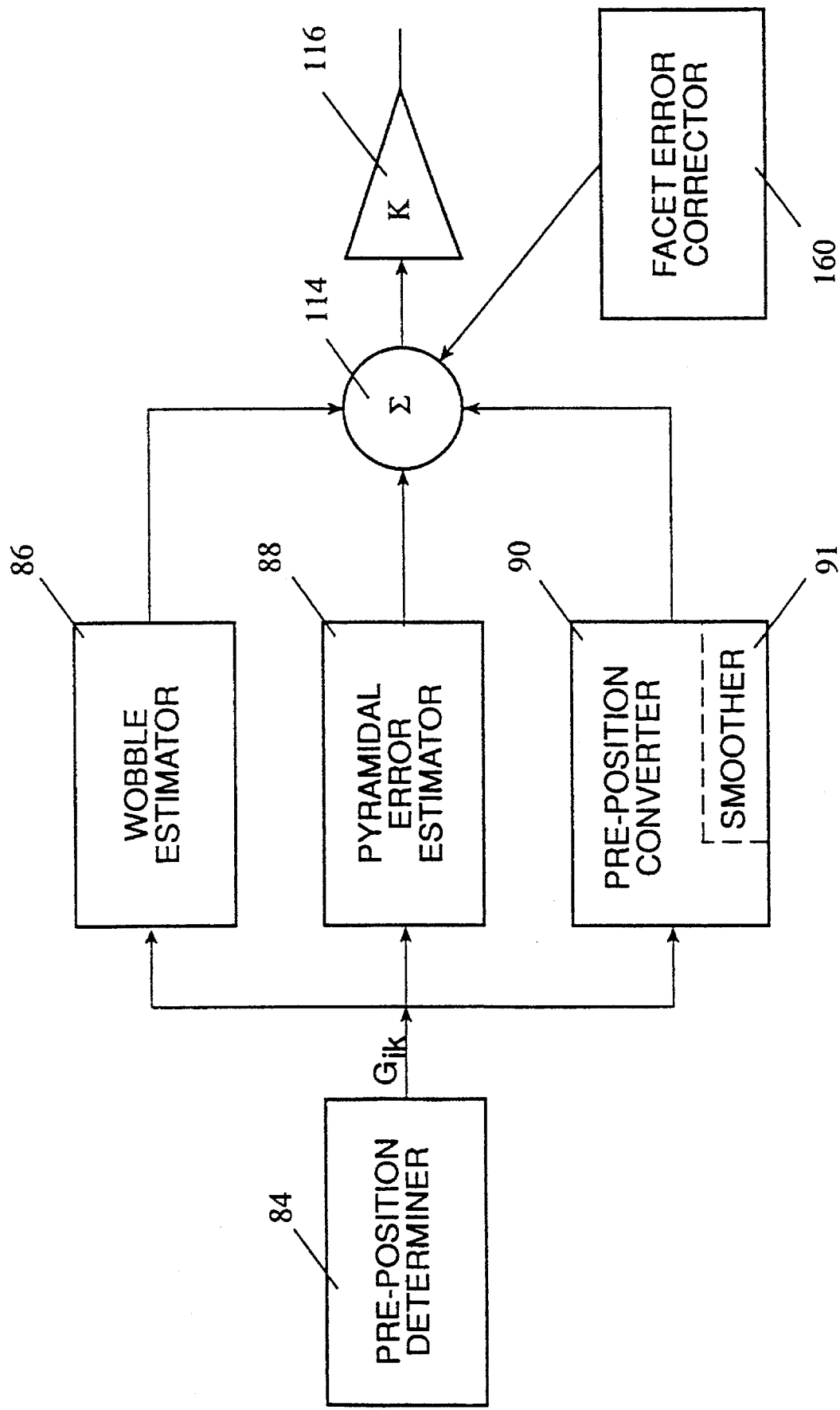
FIG. 10 is a block diagram illustration of elements of an alternative embodiment of the beam location corrector.

Reference is now made to FIG. 10 which illustrates an alternative embodiment of the present invention. If the facets of the spinner are not completely flat, they cause a further angular cross-scan error. Therefore, the beam misalignment corrector in this embodiment additionally comprises a facet error corrector 160 whose output is directly provided to summer 114.

Prior to operation of the scanner, the extent of "non-flatness" of each facet at each point along the scan line is measured and stored. Facet error corrector 160 provides an appropriate correction, as is known in the art, for the non-flatness of the the current operative facet and the current point along the scan line.

It will be appreciated by persons skilled in the art that the present invention is not limited to what has been particularly shown and described hereinabove. Rather the scope of the present invention is defined only by the claims which follow:

We claim:

1. A laser scanning device, the device comprising:

a spinner for scanning a light beam having a light spot across a scanning line;

one light spot misalignment detector located generally at a beginning of said scanned line for measuring an initial misalignment of said light spot in a cross-scanning direction; and a beam misalignment corrector which, during scanning along said scanning line, dynamically corrects scanning misalignment of said light beam in accordance with at least said initial misalignment, wherein beam said misalignment corrector comprises:
a pre-positioner which determines a pre-position signal which offsets said initial misalignment;
estimation means for producing, from at least said pre-position signal, an estimated scanning misalignment;

wherein said estimation means further comprises:
a pyramidal error estimator for estimating a first portion of said scanning misalignment due to pyramidal error and to an extent of wobble present at the beginning of said scanning line;
a wobble estimator for estimating a second portion of said scanning misalignment caused by said wobble; and
a summer for summing outputs of said pyramidal error estimator, said wobble estimator and said pre-positioner; and a beam shifter responsive to said estimated scanning misalignment for shifting said light beam thereby to correct said scanning misalignment.

2. A laser scanning device according to claim 1 and wherein said pyramidal error estimator comprises a misalignment function storer for storing a misalignment function and a multiplier receiving said pre-position signal for multiplying said misalignment function by said pre-position signal.

3. A laser scanning device according to claim 1 and wherein said wobble estimator comprises:

a frequency detector which detects a spinning frequency of said spinner;

a phase locked loop which produces a clock signal which is proportional to said spinning frequency; and filters whose cutoff frequencies are adaptively defined by said clock signal for filtering a plurality of pre-position signals thereby to produce said second portion of said scanning misalignment.

4. A laser scanning device according to claim 1 and wherein said estimation means additionally comprises a facet error corrector for correcting for the non-flatness of facets of said spinner and wherein said summer additionally sums the output of said facet error corrector.

5. A laser scanning device, the device comprising:

a spinner for scanning a light beam having a light spot across a scanning line;

one light spot misalignment detector located generally at a beginning of said scanned line for measuring an initial misalignment of said light spot in a cross-scanning direction; and a beam misalignment corrector which, during scanning along said scanning line, dynamically corrects scanning misalignment of said light beam in accordance with at least said initial misalignment, wherein said spinner comprises a plurality of facets and wherein said beam misalignment corrector additionally includes means for correcting in accordance with the current operative facet, and wherein said beam misalignment corrector additionally comprises a smoother for moving said light beam from a final location of a current scan line scanned with a current facet of said spinner to a first estimated location of a next scan line, wherein said first estimated location is the value of the pre-position signal measured when the next facet was last utilized.

6. A laser scanning device, the device comprising:

a spinner for scanning a light beam having a light spot across a scanning line;

one light spot misalignment detector located generally at a beginning of said scanned line for measuring an initial misalignment of said light spot in a cross-scanning direction;

a beam misalignment corrector which, during scanning along said scanning line, dynamically corrects scanning misalignment of said light beam in accordance with at least said initial misalignment, wherein said beam misalignment corrector comprises:

a pre-positioner which determines a pre-position signal which offsets said initial misalignment;

estimation means for producing, from at least said pre-position signal, an estimated scanning misalignment; and a beam shifter responsive to said estimated scanning misalignment for shifting said light beam thereby to correct said scanning misalignment, and wherein said pre-positioner comprises a closed loop control system controlling said beam shifter and operative to generally cancel said initial misalignment.

7. A method of laser scanning, the method comprising the steps of:

reflecting a light beam having a light spot across a scanning line;

measuring an initial misalignment of said light spot in a cross-scanning direction; and during scanning, dynamically correcting scanning misalignment of said light beam in accordance with at least said initial misalignment, wherein said step of producing comprises the steps of:

estimating a first portion of said scanning misalignment due to pyramidal error and to an extent of wobble present at the beginning of said scanning line;

estimating a second portion of said scanning misalignment caused by said wobble; and summing said first and second portions with said pre-position signal.

8. A method according to claim 7 and wherein said step of dynamically correcting comprises the steps of:

determining a pre-position signal which offsets said initial misalignment;

producing, from at least said pre-position signal, an estimated scanning misalignment; and shifting said light beam in response to said estimated scanning misalignment thereby to correct said scanning misalignment.

9. A method according to claim 7 and wherein said step of producing additionally comprises the step of correcting for the non-flatness of facets of said spinner and wherein said step of summing additionally sums the output of said step of correcting.

10. A method according to claim 7 wherein said step of reflecting is performed with a spinner and wherein said second step of estimating comprises the steps of:

detecting a spinning frequency of said spinner;

producing, via a phase locked loop, a clock signal which is proportional to said spinning frequency; and filtering a plurality of pre-position signals with filters whose cutoff frequencies are adaptively defined by said clock signal.

* * * * *